US006956192B2

(12) United States Patent
Ishika

(10) Patent No.: US 6,956,192 B2
(45) Date of Patent: Oct. 18, 2005

(54) OPTICAL HEAD AND OPTICAL DISK DRIVE

(75) Inventor: Sou Ishika, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/932,328

(22) Filed: Sep. 2, 2004

(65) Prior Publication Data

US 2005/0072900 A1 Apr. 7, 2005

(30) Foreign Application Priority Data

Sep. 3, 2003 (JP) ........................................ 2003-311598

(51) Int. Cl.[7] ................................................ G11B 7/00
(52) U.S. Cl. ................. 250/201.5; 250/225; 369/44.37; 369/112.03; 369/112.16
(58) Field of Search .......................... 250/201.5, 201.2, 250/201.4, 225, 237 G; 369/44.14, 44.23, 44.26, 44.37, 53.23, 112.03–112.07, 112.1, 112.12, 112.15, 112.16

(56) References Cited

U.S. PATENT DOCUMENTS

2004/0246853 A1 * 12/2004 Imai ........................ 369/53.19

FOREIGN PATENT DOCUMENTS

JP        2003-16672        1/2003

* cited by examiner

*Primary Examiner*—Kevin Pyo
(74) *Attorney, Agent, or Firm*—Piilsbury Winthrop Shaw Pittman LLP

(57) ABSTRACT

A DVD laser emits a first light beam, and a CD laser emits a second light beam. An optical diffraction element diffracts first and second reflected lights corresponding to the first and second light beams, respectively. An optical detection element detects the first and second reflected lights reflected from a polarizing beam splitter. The optical axes of the CD and DVD lasers are set to diverge from each other. Thus, reflected light components necessary for focusing and tracking of a CD and a DVD are all detected by a detection element.

7 Claims, 8 Drawing Sheets

PLAN VIEW OF LIGHT

DARK PORTION GENERATED DUE TO CANCELLATION    DARK PORTION GENERATED DUE TO CANCELLATION

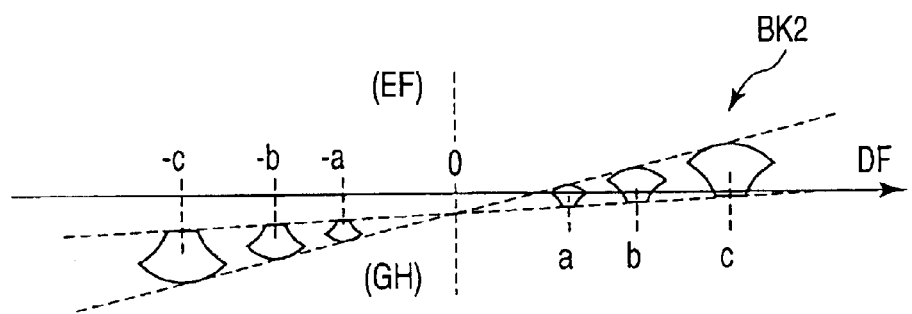
F I G. 9 A
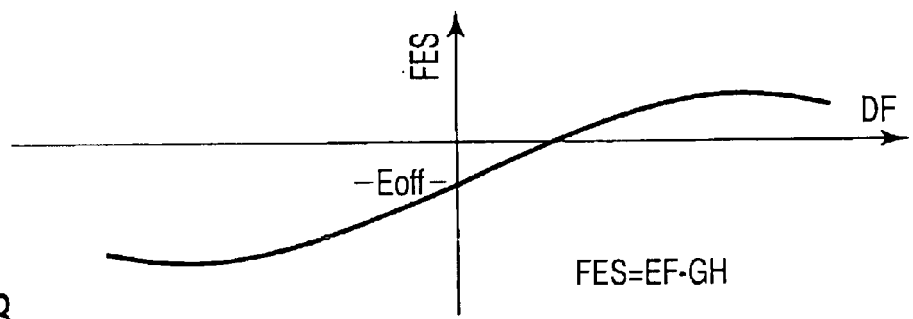
F I G. 9 B
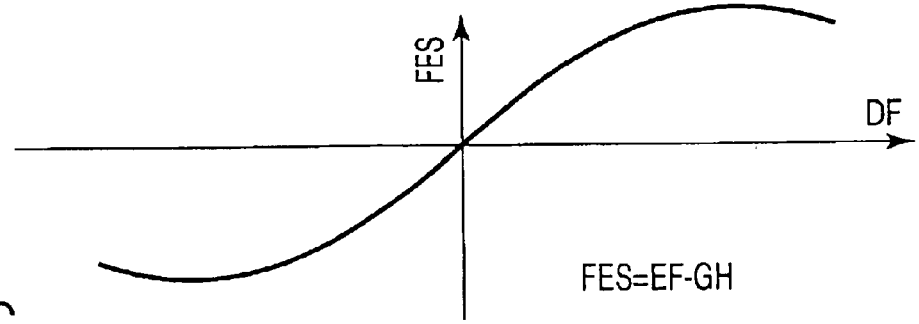
F I G. 9 C

OPTICAL HEAD AND OPTICAL DISK DRIVE

CROSS-REFERENCE TO RELATED APPLICATIONS

This application is based upon and claims the benefit of priority from prior Japanese Patent Application No. 2003-311598, filed Sep. 3, 2003, the entire contents of which are incorporated herein by reference.

BACKGROUND OF THE INVENTION

1. Field of the Invention

The present invention relates to an optical head which emits a light beam onto an optical disk, and detects the light beam reflected therefrom, and an optical disk drive provided with the optical head.

2. Description of the Related Art

An optical disk drive has an optical head provided with an objective lens and a photodetector, etc. The optical head radiates a light beam onto a recorded surface of an optical disk, and detects reflected light from the optical disk. Based on the detected reflected light, information recorded on the optical disk is read.

Also, the optical head radiates a light beam onto a recording surface of an optical disk to record desired information on the optical disk.

It will be explained how various signals are generated based on the reflected light from the optical disk.

The reflected light from the optical disk is guided to predetermined light detection areas of the photodetector by the objective lens and optical elements. The photodetector converts the guided reflected light into an electrical signal. Based on the electrical signal obtained by the photodetector, a tracking control signal is generated. Also, based on the electrical signal obtained by the photodetector, a focusing control signal is generated. The tracking control signal is applied to a tracking control for making the spot of light projected onto the recorded surface of the optical disk coincide with a track center on the recorded surface. The focusing control signal is applied to a focusing control for changing the position of the objective lens such that the spot of focused light is formed on the recorded surface. Based on the electrical signal obtained by the photodetector, a reproduction signal of information recorded on the optical disk is generated.

The objective lens is held by a lens holder. The lens holder is supported by one end portion of a number of elastic supporting springs. The small movement of the lens holder is controlled by a tracking coil and a focusing coil. Thereby, shifting of the lens is achieved, and focusing and tracking are also achieved.

Furthermore, in recent years, digital versatile disks (DVDs) have spread remarkably, and dual-standard equipment, i.e., optical disk drives that can handle both DVDs and compact disks (CDs) has come to the market. As is well known, the recording density of a DVD is greatly different from that of a CD. Accordingly, the wavelength of a light beam applied to a DVD is also different from that applied to a CD. Thus, the dual-standard equipment needs to process two beams having different wavelengths. Such dual-standard equipment is disclosed in Jpn. Pat. Appln. KOKAI Publication No. 2003-16672.

As a method for generating a focusing error signal, a knife-edge method is known. In the knife-edge method, a knife-edge is provided in a position midway in an optical path in which light reflected from the disk is converged, and the movement amount of a light spot image on a photoreceptor is detected, to thereby generate a focusing error signal.

Furthermore, when the knife-edge method is applied to focusing, optical diffraction elements such as holograms and optical detection elements for generating focusing and tracking error signals must be separately provided for DVD and CD, respectively. For example, in the technique disclosed in Jpn. Pat. Appln. KOKAI Publication No. 2003-16672, an optical detection element and an optical diffraction element for DVD are provided separate from a laser for DVD, and an optical detection element and an optical diffraction element for CD and a laser for CD are provided as a single unit.

BRIEF SUMMARY OF THE INVENTION

In the present invention, arrangement of cells of an optical detection section (PDIC) is adjusted, and, an the optical axes light beams having different wavelengths are made to diverge from each other. Thereby, a focusing error signal and a tracking error signal such as DPP (Differential Push Pull) or DPD (Differential Phase Detection) can be generated with a knife-edge method by using a single diffraction element (HOE).

An optical head according to an embodiment of the present invention comprises: a first light emitting unit configured to emit a first light beam having a first wavelength and a first optical axis; a second light emitting unit configured to emit a second light beam having a second wavelength greater than the first wavelength and a second optical axis; a polarizing unit configured to polarize the first and second light beams respectively emitted from the first and second light emitting units, and reflects a first reflected light and a second reflected light which are obtained when the first and second light beams are reflected from an optical disk, respectively; a converging unit configured to converge the first and second light beams transmitted through the polarizing unit on the optical disk; a detecting unit configured to detect the first and second reflected lights reflected from the polarizing unit; and a diffracting unit provided on optical paths of the first and second reflected light beams, which are located between the polarizing unit and the converging unit, the diffracting unit being configured to diffract the first and second reflected lights. The first and second light emitting units are provided such that when the first and second light beams are incident on the converting unit, one of the first and second optical axes of the first and second light beams diverges from the other by a predetermined angle.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the preferred embodiments given below, serve to explain the principles of the invention.

FIGS. 9A, 9B and 9C are third views showing a relationship between the defocus amount DF and the focusing error signal FES.

DETAILED DESCRIPTION OF THE INVENTION

The embodiment of the present invention will be explained with reference to the accompanying drawings.

Figure 1:
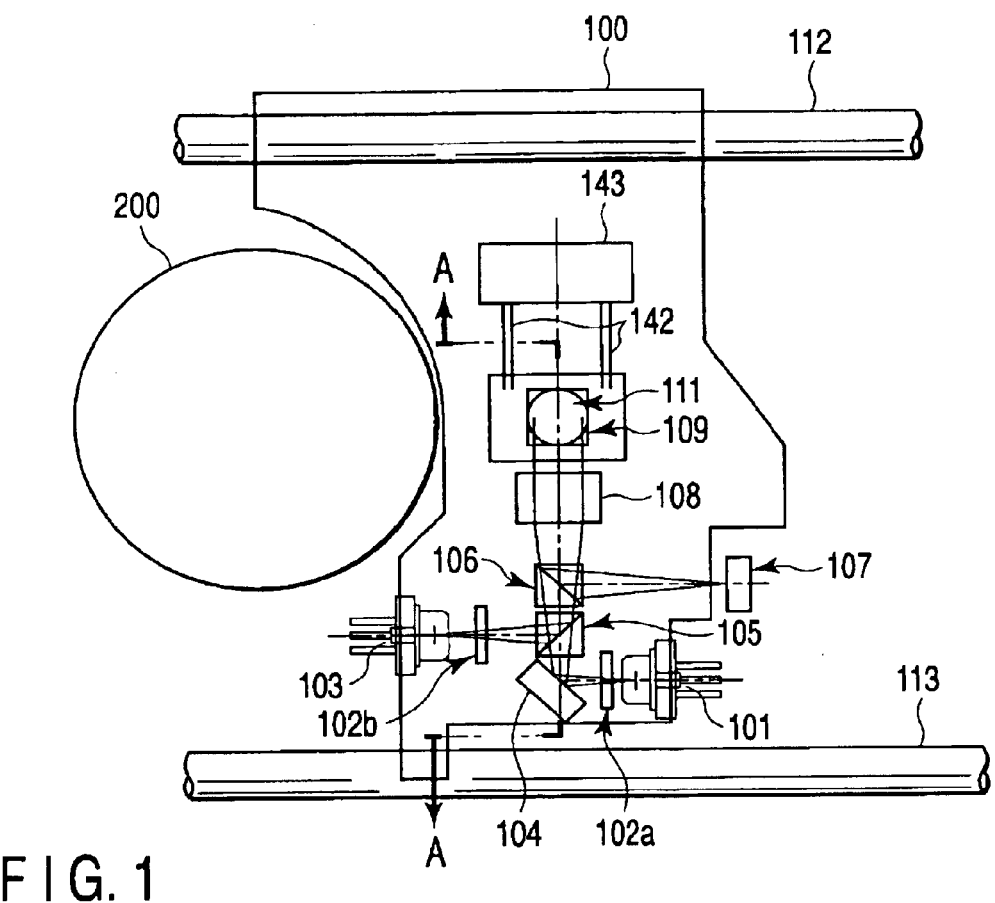
FIG. 1 is a plan view showing a schematic structure of an optical pickup head (optical head) according to the first embodiment of the present invention.
Figure 2:
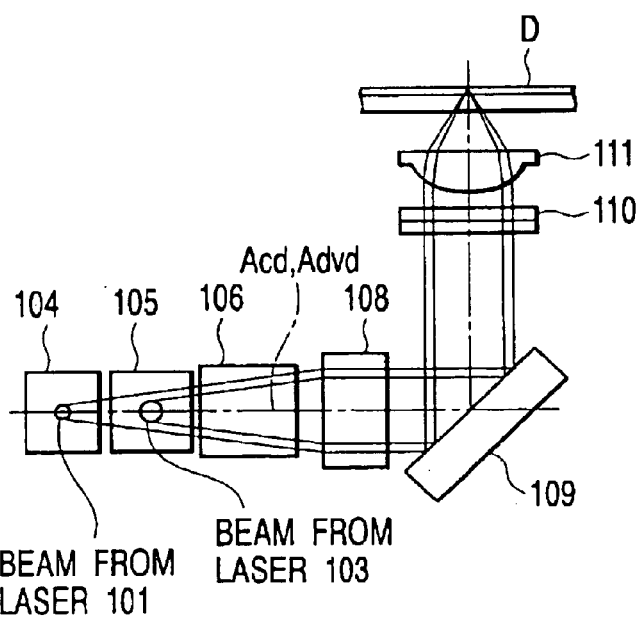
FIG. 2 is a view showing a vertical section taken along line A—A in the optical pickup head shown in FIG. 1.

FIG. 1 is a plan view showing a schematic structure of an optical pickup head (optical head) according to the first embodiment of the present invention. FIG. 2 is a view showing a vertical section taken along line A—A in the optical pickup head shown in FIG. 1. In the plan view of FIG. 1 and the vertical sectional view of FIG. 2, part of the structure of the optical pickup head is omitted in order that the structure may be easily viewed.

The optical pickup head includes a chassis 100, which is controlled by a thread motor (not shown) with respect to its reciprocation operation along guide rails 112 and 113. The chassis 100 is moved radially under an optical disk D loaded onto a turntable 200. In the first embodiment, a compact disk (CD) and a digital versatile disk (DVD) can be each applied as the optical disk D to be subjected to recording and/or reproduction.

On the chassis 100, a DVD laser 101, diffraction gratings 102a and 102b, a CD laser 103, a mirror 104, a dichroic mirror 105, a polarizing beam-splitter (PBS) 106, an optical detection element (PDIC) 107, a collimate lens 108, a mirror 109, an optical diffraction element (HOE) 110 and an objective lens 111 are provided.

First, recording and reproduction of a DVD will be explained.

A DVD laser 101 emits a first light beam having a first wavelength (e.g., approximately 650 nm). The first light beam emitted from the DVD 101 passes through the diffraction grating 102a, and is reflected by the mirror 104. It then passes through the dichloic mirror 105, and then also through the polarizing beam-splitter 106. Under the circumstances, the first light beam is polarized by the polarizing beam-splitter 106. Also under the circumstances, to be more accurate, the first beam is divided into one main beam and two sub beams by the diffraction grating 102a. However, to simplify the explanation of this portion, the main beam from the DVD laser 101 will be referred to as the first light beam.

The first light beam passing through the polarizing beam-splitter 106 is parallelized by the collimate lens 108, and is directed upward by the mirror 109. The first light beam directed upward by the mirror 109 passes through the optical diffraction element 110, and is converged on the recording surface of an optical disk (DVD) by the objective lens 111. Due to the above convergence of the first light beam (first beam having power for recording), information can be recorded on the optical disk (DVD).

Next, at the time of reproduction, light reflected from the optical disk, i.e., first reflected light corresponding to the first light beam, which is obtained from the optical disk, is diffracted by the optical diffraction element 110. Then, the first reflected light is reflected by the mirror 109, passes through the collimate lens 108, and is reflected by the polarizing beam-splitter 106. The first reflected light reflected from the polarizing beam-splitter 106 is detected by the optical detection element 107. Based on the first reflected light (reflected light of the first light beam having power for reproduction) detected by the optical detection element 107, information recorded on the optical disk (DVD) is reproduced, tracking is controlled, and focusing is controlled. Diffraction of the first reflected light by the optical diffraction element 110, detection of the first reflected light by the optical detection element 107, tracking control and focusing control will be explained in detail later.

Recording and reproduction of a CD will be explained. The CD laser 103 emits a second light beam having a second wavelength (e.g., 780 nm) which is greater than the first wavelength. The optical axis Acd of the second light beam diverges from the optical axis Advd of the first light beam by a slight predetermined angle as described later. To be more specific, the optical axis of the second light beam is inclined with respect to that of the first light beam at a slight predetermined angle.

The second light beam emitted from the CD laser 103 passes through the diffraction grating 102b, and is reflected by the dichloic mirror 105. Then, it passes through the polarizing beam-splitter 106. Under the circumstances, the second light beam is polarized by the polarizing beam-splitter 106. Also under the circumstances, to be more accurate, the second light beam is divided into one main beam and sub beams by the diffraction grating 102b. However, to simplify the explanation of this portion, the main beam from the CD laser 103 will be referred to as the second light beam.

The second light beam passing through the polarizing beam-splitter 106 is parallelized by the collimate lens 108, and is directed upward by the mirror 109. The second light beam directed upward by the mirror 109 passes through the optical diffraction element 110, and is converged on the recording surface of the optical disk (CD) by the objective lens 111. Due to the above convergence of the light beam (second beam having power for recording), information can be recorded on the optical disk (CD).

Next, at the time of reproduction, light reflected from the optical disk, i.e., second reflected light corresponding to the second light beam, which is obtained from the optical disk, is diffracted by the optical diffraction element 110. Then, the second reflected light passes through the mirror 109 and the collimate lens 108, and is reflected by the polarizing beam-splitter 106. The second reflected light reflected from the polarizing beam-splitter 106 is detected by the optical detection element 107. Based on the second reflected light (reflected light of the second light beam having power for reproduction) detected by the optical detection element 107, information recorded on the optical disk (CD) is reproduced, tracking is controlled, and focusing is controlled. Diffraction of the second reflected light by the optical diffraction element 110, detection of the second reflected light by the optical detection element 107, tracking control and focusing control will be explained in detail later.

Figure 3:
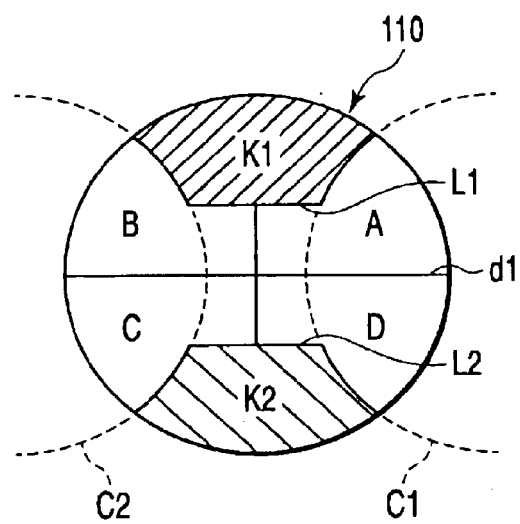
FIG. 3 is a view schematically showing diffraction areas of an optical diffraction element 110.

The optical diffraction element 110 and the principle of detection of the reflected light by the optical detection element 107 will be explained in detail. FIG. 3 is a view schematically showing diffraction areas of the optical diffraction element 110.

As shown in FIG. 3, the optical diffraction element 110 includes a first diffraction area A, a second diffraction area D, a third diffraction area B, a fourth diffraction area C, a fifth diffraction area K1, and a sixth diffraction area K2. The optical diffraction element 110 is circular, and will be referred to as a reference circle.

Two circles, which are located opposite to each other with respect to a center portion of the reference circle, and which have their centers located on extension lines of a center line d1 of the reference circle, will be referred to as a first circle C1 and a second circle C2. Two line segments which are parallel to the center line d1 of the reference circle, and are located opposite to the center line d1 of the reference circle, will be referred to as a line segment L1 and a line segment L2. The line segment L1 is a line extending between a point on the circumference of the first circle C1 and a point on the circumference of the second circle C2, in one of semicircular segments of the reference circle, between which the boundary is defined by the center line d1. The line segment L2 is a line extending between another point on the circumference of the first circle C1 and another point on the circumferential of the second circle C2, in the other of the semicircular segments of the reference circle.

The fifth diffraction area K1 is an area which is located in the above one of the semicircular segments of the reference circle, in which the first circle C1 and the second circle C2 are not located, and which is located between the line segment L1 and an outer peripheral part of the reference circle. The sixth diffraction area K2 is an area which is located in the other of the semicircular segments of the reference circle, in which the first circle C1 and the second circle C2 are not located, and which is located between the line segment L2 and another outer peripheral part of the reference circle. That is, the fifth diffraction area K1 is smaller than each of the semicircular segments of the reference circle. In the fifth area K1, a diffraction grating having bars arranged at a first pitch is provided. The sixth diffraction area K2 is located on the opposite side to the fifth diffraction area K1 with respect to the center line d1 of the reference circle, and has substantially the same size as the fifth diffraction area K1. In the sixth diffraction area K2, a diffraction grating having bars arranged at a second pitch differing from the first pitch is provided.

The first diffraction area A, the second diffraction area D, the third diffraction area B and the fourth diffraction area C are areas in the reference circle, in which the fifth diffraction area K1 and the sixth diffraction area K2 are not located, and which are located in four quadrants of the reference circle which are defined by the center line d1 and a line perpendicular thereto. To be more specific, the overlapping area of the reference circle and first circle C1 is divided into two areas with respect to the center line d1, and one of the two areas is the first diffraction area A, and the other is the second diffraction area D, as shown in FIG. 3. Also, the overlapping area of the reference circle and second circle C2 is divided into two areas with respect to the center line d1, and one of the two areas is the third diffraction area B, and the other is the fourth diffraction area C, as shown in FIG. 3.

The optical diffraction element 110 divides the first reflected light into light components by using the first diffraction area A, second diffraction area D, third diffraction area B, fourth diffraction area C, fifth diffraction area K1 and sixth diffraction area K2.

Furthermore, in the fifth diffraction area K1, as stated above, the bars of the diffraction grating are arranged at the first pitch (relatively small pitch). In the sixth diffraction area K2, the bars of the diffraction grating are arranged at the second pitch (relatively great pitch) greater than the first pitch. For example, the second pitch is approximately 10 $\mu$m. The bars of the diffraction gratings in the fifth diffraction area K1 and sixth diffraction area K2 are arranged to extend perpendicular to the center line d1 of the reference circle as shown in FIG. 3.

Figure 4:
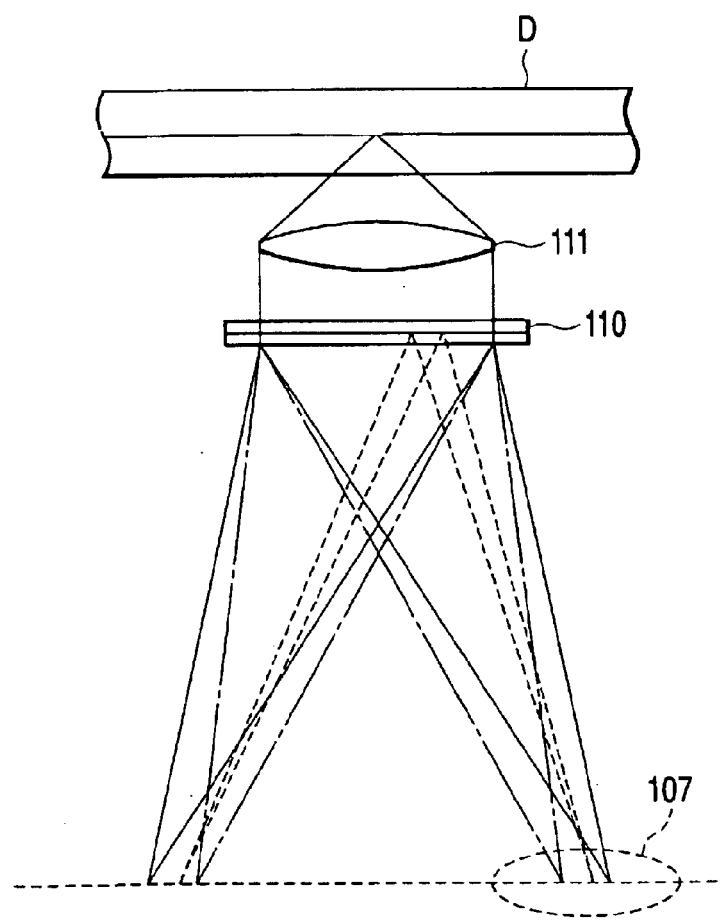
FIG. 4 illustrates a state wherein after light reflected from a disk D passes through an objective lens 111 and is incident on the optical diffraction element 110, it is diffracted by the optical diffraction element 110.

FIG. 4 illustrates a state wherein after light reflected from the disk D passes through the objective lens 111 and is incident on the optical diffraction element 110, it is diffracted by the optical diffraction element 110. When the reflected light passes through the optical diffraction element 110, + first-order diffraction light and − first-order diffraction light are obtained. It should be noted that an explanation of zero-order diffraction light will be omitted in order to simplify the explanation of this portion. The optical detection element 107 is provided close to a position where the + first-order diffraction light or − first-order diffraction light is converged. In the first embodiment, the optical detection element 107 is provided close to a position where the − first-order diffraction light is converged.

Figure 5:
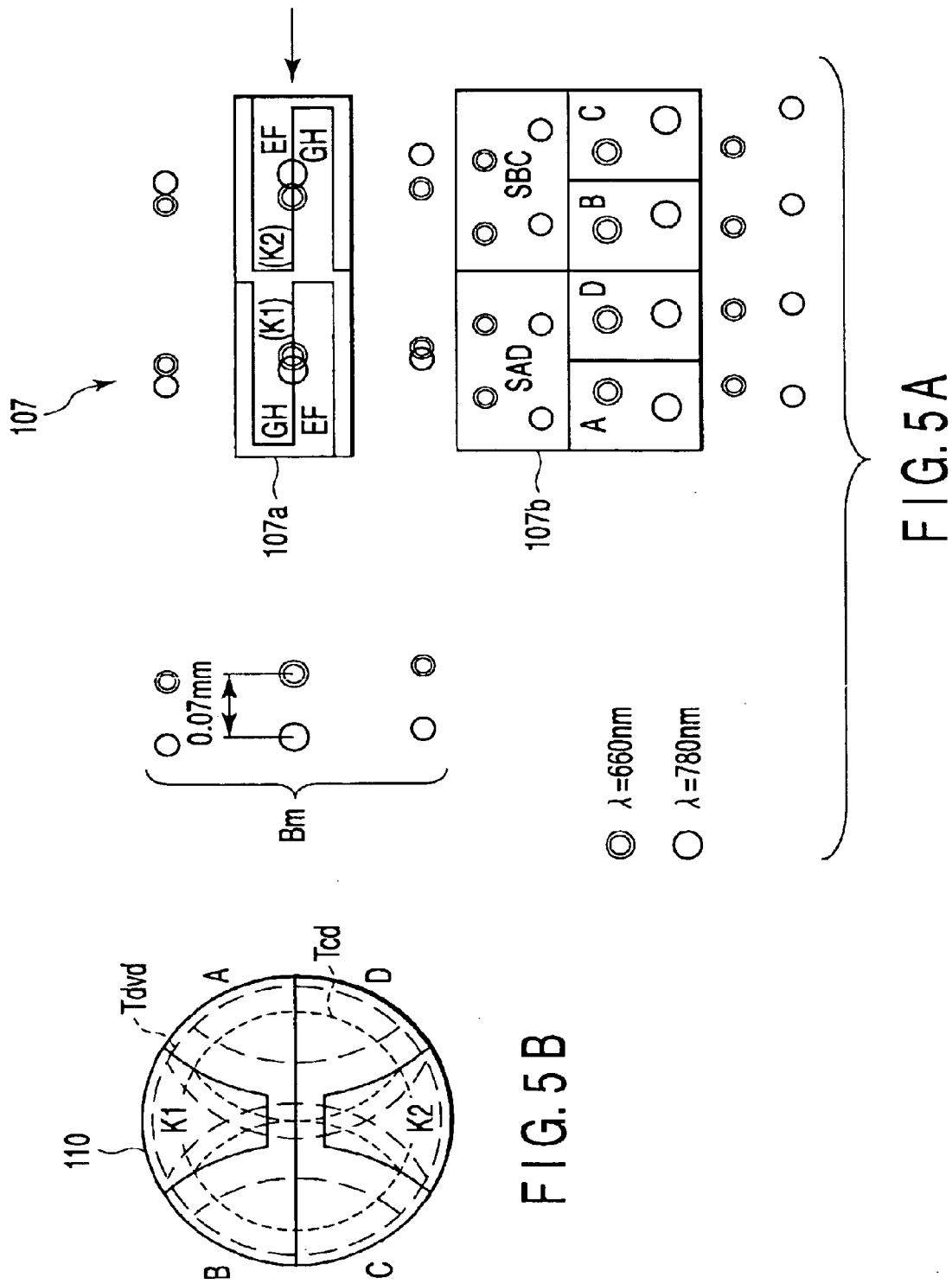
FIGS. 5A and 5B are views showing the structure of an optical detection element 107 and the structure of an the optical diffraction element 110, respectively.

FIG. 5A is a view showing the structure of the optical detection element 107. FIG. 5B shows a state wherein reflected light and diffraction light of the DVD and the CD are radiated onto the optical diffraction element 110. In FIG. 5A, "⊙" represents the beam spot of a first reflected light component of the first reflected light beam from the DVD laser, and "○" represents the beam spot of a second reflected light component of the second reflected light beam from the CD laser. The beam spots of six reflected light components represented by "Bm" are those of zero-order diffraction light. Other beam spots are beam spots of − first-order diffraction light. Furthermore, FIG. 5A shows beam spots obtained by a three-beam method which will be described later. For example, a light beam emitted from the DVD laser 101 is divided into one main beam and two sub beams by the diffraction grating 102a. These three beams are reflected from the optical disk, and then diffracted by the diffraction areas of the diffraction grating 110. As a result, beam spots whose number is a multiple of three are formed as shown in FIG. 5A.

The optical detection element 107 includes a detection area 107a for focusing, which receives the first or second reflected light components diffracted by the optical diffraction element 110, and generates a focusing error signal. The detection area 107a comprises detection areas EF and detection areas GH.

Furthermore, of the detection areas EF and detection areas GH, left-hand detection areas GH and EF, which are shown on the left side of the detection areas 107a as viewed in FIG. 5A, correspond to the fifth diffraction area K1 of the optical diffraction element 110. That is, the first or second reflected light components diffracted by the fifth diffraction area K1 (including a diffracting grating having bars arranged at the first pitch) are guided to the left-hand detection areas GH and EF by the diffraction grating formed in the fifth diffraction area K1, and are detected by the left-hand detection areas GH and EF. To be more specific, the reflected light components diffracted by the fifth diffraction area K1 are converged onto a boundary line between the left-hand detection areas GH and EF or the vicinity of the boundary line.

Of the detection areas EF and detection areas GH, right-hand detection areas EF and GH, which are shown on the right side of the detection areas 107a as viewed in FIG. 5A, correspond to the sixth diffraction area K2 of the optical diffraction element 110. That is, the first or second reflected light components diffracted by the sixth diffraction area K2 (including a diffraction grating having bars arranged at the second pitch) are guided to the right-hand detection areas GH and EF by the diffraction grating formed in the sixth diffraction area K2, and are detected by the right-hand detection areas EF and GH. To be more specific, the reflected light components diffracted by the sixth diffraction area K2 are converged onto a boundary line between the right-hand detection areas EF and GH or the vicinity of the boundary line. The left-hand detection area GH and the right-hand detection area GH are continuous with each other, and operate as a single optical detection element. Also, the left-hand detection area EF and the right-hand detection area EF are continuous with each other, and operate as a single optical detection element.

Then, as a method for generating a focusing error signal, a knife-edge method will be explained.

Figure 6:
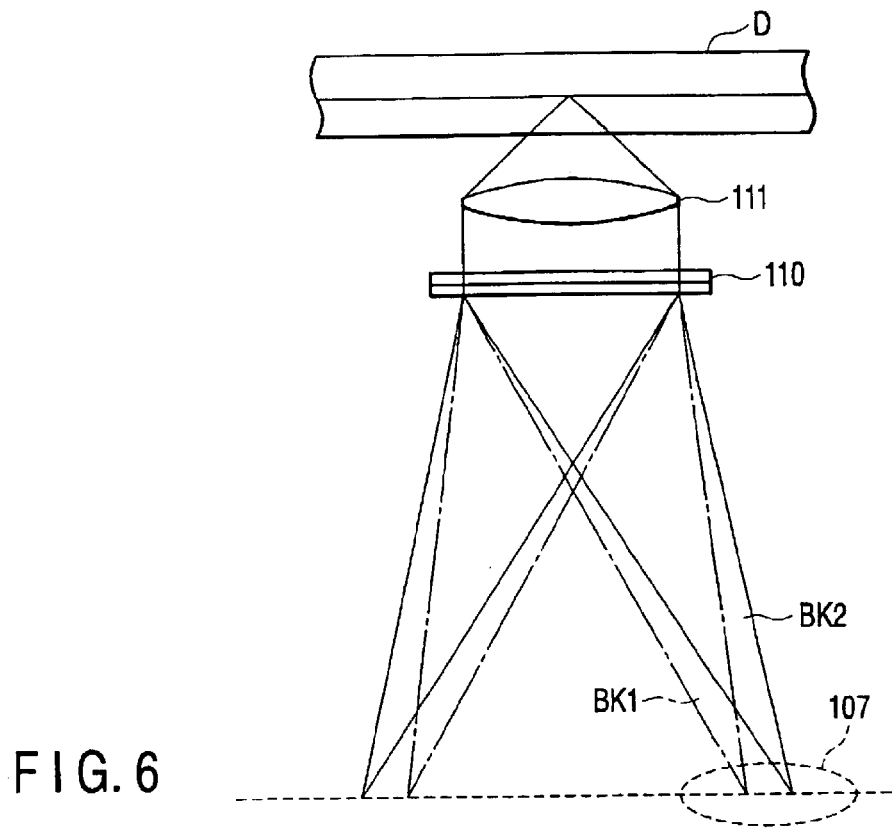
FIG. 6 shows + first-order and − first-order diffraction light components diffracted by diffraction areas K1 and K2.

FIG. 6 shows + first-order and − first-order diffraction light components diffracted by the diffraction areas K1 and K2 of reflected light components which are diffracted by the optical diffraction element 110, after being reflected from the disk D and incident on the optical diffraction element 110 through the objective lens 111. Of those diffraction light components, a light component diffracted by the diffraction area K1 and incident on the optical detection element 107 will be referred to as a beam BK1, and a light component diffracted by the diffraction area K2 and incident onto the optical detection element 107 will be referred to as a beam BK2.

Figure 7A:
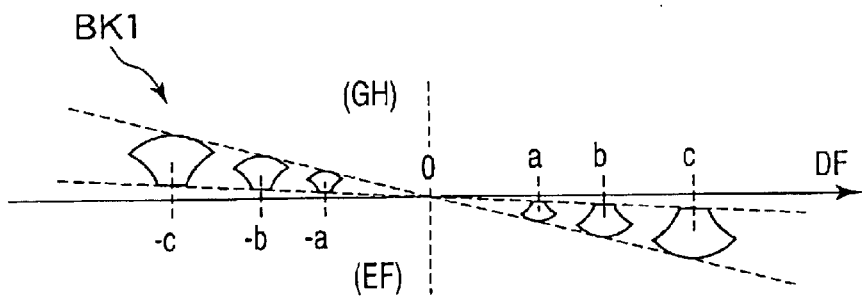
FIGS. 7A and 7B are first views showing a relationship between a defocus amount DF and a focusing error signal FES.
Figure 7B:
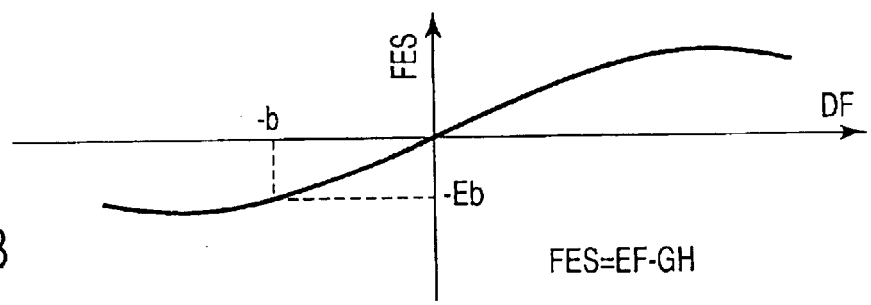

FIG. 7A shows a state wherein the beam BK1 is incident on the left-hand detection areas GH and FE of the detection area 107a for focusing, and a defocus amount varies. The lateral axis indicates the defocus amount DF, and the upper and lower sides of each figure with respect to the lateral axis correspond to the detection area GH and the detection area FE, respectively. The defocus amount means the difference between the distance between the recording surface of the disk and the lens 111 and the focal length of the lens 111, i.e., it means an error in focusing. FIG. 7A shows, by way of example, the beam spots of the beams BK1 on the optical detection element 107, which are obtained when the defocus amounts are "−c", "−b", "−a", "a", "b" and "c", respectively. FIG. 7B shows the characteristics of a focusing error signal FES corresponding to the beam K1 in FIG. 7A, and the lateral axis indicates the defocus amount DF and the vertical axis indicates the value of the focusing error signal FES. For example, when the defocus amount DF is "−b", the value of the output focusing error signal FES is −Eb(V), and when the defocus amount DF is zero, i.e., the beam is focused, the value of the output focusing error signal FES is 0 (V).

Figure 8A:
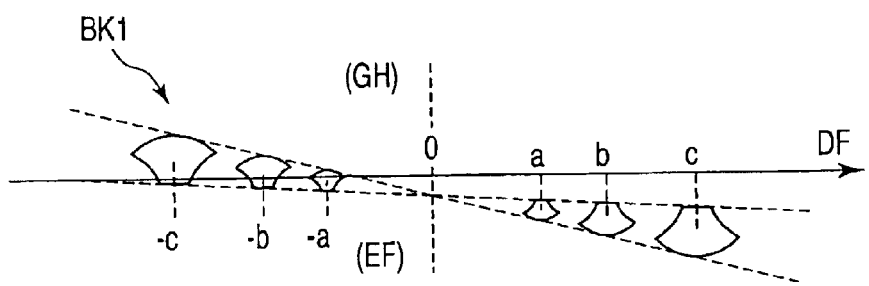
FIGS. 8A and 8B are second views showing a relationship between the defocus amount DF and the focusing error signal FES.

However, it is difficult to maintain the above ideal state for a long time. The above characteristics vary as a result of temperature change or with the passage of time. For example, the beam spot of the beam BK1 which is obtained when it is focused is displaced toward the upper side or lower side as shown in FIG. 8A (in the example of FIG. 8A, it is displaced toward the lower side, i.e., the EF side). Thus, an offset signal Eoff (+Eoff(V)) is output as the focusing error signal FES.

Figure 8B:
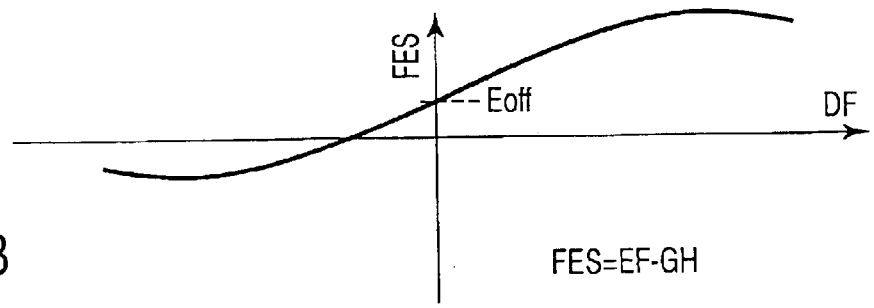

To compensate for the offset of the focusing error signal, the beam BK2 is used. FIG. 9A shows that the beam BK2 is incident on the right-hand detection areas GH and EF of the detecting area 107a for focusing, and the defocus amount varies. FIG. 9B shows the characteristics of a focusing error signal FES corresponding to the beam BK2 in FIG. 9A. Also, the beam spot of the beam BK2 which is obtained when it is focused is displaced in the same direction as the beam BK1 (in the example of FIG. 9A, it is displaced toward the lower side, i.e., the GH side). Thus, when the beam is focused, an offset signal −Eoff(V) is output as the focus error signal FES. The offset signal −Eoff(V) is opposite in polarity to an offset signal obtained in the case of using the beam BK1 in FIG. 8, and the absolute values of those offset signals are substantially equal to each other.

FIG. 9C shows the characteristics of a focusing error signal which is a combination of a focusing error signal generated in the case of using the beam BK1 in FIG. 8C and a focusing error signal in the case of using the beam BK2 in FIG. 9B. In this case, the value of the focusing error signal shown in FIG. 9C is zero when the beams BK1 and BK2 are focused. In such a manner, when the two beams BK1 and BK2 are used to generate a focusing error signal, their offsets are canceled by each other.

In such a manner, the optical detection element 107 can accurately detect both the first and second reflected light components in order to obtain focusing error signals of the DVD and CD. Also, the optical detection element 107 can detect both the first and second reflected light components in order to obtain tracking error signals of the DVD and CD as described later. That is, the optical detection element 107 can detect the first and second reflected light components in order to obtain focusing error signals and tracking error signals of the DVD and CD.

This is because the optical axis of the first light beam emitted from the DVD laser 101 is located to diverge from that of the second beam emitted from the CD laser 103. That is, the DVD laser 101 and the CD laser 103 are provided such that the optical axes of the first and second light beams incident on the objective lens 111 diverge from each other by a predetermined angle. The distance "0.07 mm" between main beams Bm (zero-order diffraction light) indicated in FIG. 5A depends on the above divergence. If the above optical axes do not diverge from each other, the distance between the first and second reflected light components diffracted by the optical diffraction element 110, on the optical detection element, is very large. Inevitably, a large optical detection element must be provided, or separate optical detection elements must be provided for the CD and the DVD, respectively.

In both the CD and the DVD, in order that the reflected light components diffracted by the optical diffraction element be incident on the detection areas of the optical detection element 107, it is necessary to adjust the optical axes of the CD laser 103 and the DVD laser 101. This adjustment is carried out in the following steps (1) to (3), which will be briefly explained:

(1) Beams BK1 and BK2 are generated by areas K1 and K2 on the optical diffraction element (HOE)110, and are projected onto the detection area 107a for focusing;

(2) A main beam for DPP is made incident on detection areas A, B, C and D of a detection area 107b for tracking, which will be describe later, and sub beams are made incident on detection areas SAD and SBC of the detection area 107; and
(3) The position and set angle of the optical detection element 107 and the optical axes of the CD laser 103 and the DVD laser 101 are adjusted such that even when either the CD or the DCD is applied, beams BK1 and BK2 are made incident on the partition between the EF and GH areas (boundary line between the areas GH and EF, which is indicated by an arrow in FIG. 5A).

Referring to FIG. 5 again, the optical detection element 107, as stated above, includes the detection area 107b for tracking, which receives the first and second reflected light components diffracted by the optical diffraction element 110, and generates a tracking error signal. The detection signal 107b includes the detection areas A to D.

The first diffraction area A of the optical diffraction element 110 is associated with the detection area A of the optical detection element 107. That is, the first or second reflected light component diffracted by the first diffraction area A of the optical diffraction element 110 is detected by the detection area A of the optical detection element 107.

The third diffraction area B of the optical diffraction element 110 is associated with the detection area B of the optical detection element 107. That is, the first or second reflected light component diffracted by the third diffraction area B of the optical diffraction element 110 is detected by the detection area B of the optical detection element 107.

The fourth diffraction area C of the optical diffraction element 110 is associated with the detection area C of the optical detection element 107. That is, the first or second reflected light component diffracted by the fourth diffraction area C of the optical diffraction element 110 is detected by the detection area C of the optical detection element 107.

The second diffraction area D of the optical diffraction element 110 is associated with the detection area D of the optical detection element 107. That is, the first or second reflected light component diffracted by the first diffraction area D of the optical diffraction element 110 is detected by the detection area D of the optical detection element 107.

Figure 10:
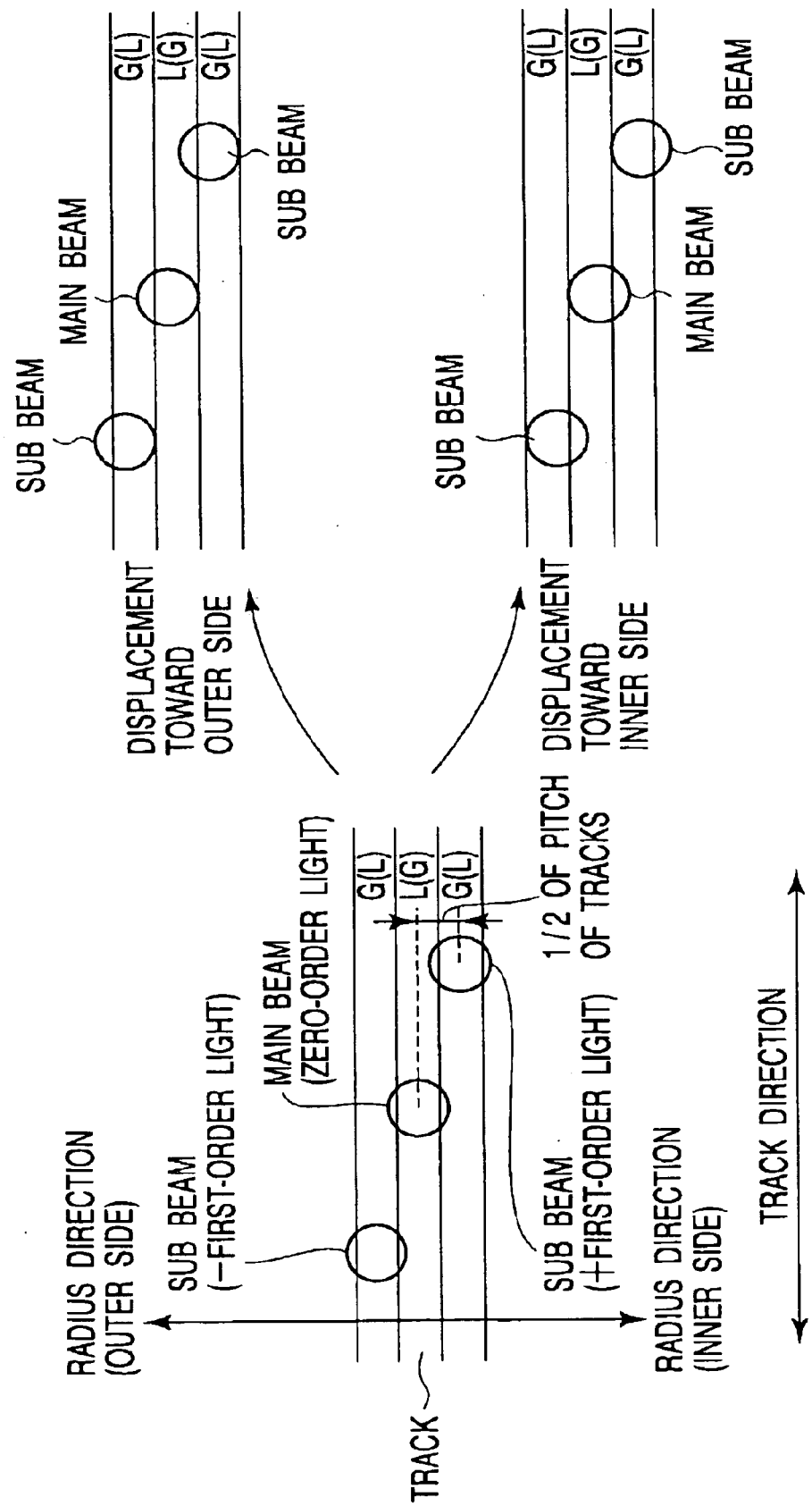
FIG. 10 is a view for use in explaining detection of reflected light by using a 3-beam method (detection of a tracking error).

Then, detection of the reflected light (tracking error detection) using the 3-beam method will be explained with reference to FIG. 10. The 3-beam method is a method for detecting the reflected light by using one main beam and two sub beams. In a recordable optical disk such as a DVD-RAM, tracks are formed along the circumferential direction of the disk. For example, land tracks (L) and groove tracks (G) are alternately arranged such that each of those tracks extends along the circumferential direction of the disk. Thus, as shown in FIG. 10, the land tracks (L) and the groove tracks (G) are alternately located in the radius direction of the disk. Three beams emitted from an optical pickup head are arranged to separate from each other in the radius direction of the disk by half the pitch of the tracks on the disk, and are converged on the disk as a sub beam (+ first-order light), a main beam (zero-order light), and another sub beam (− first-order light). In addition, the sub beam, the main beam and the other sub beam are converged on the disk in this order such that they are located on the disk at a constant pitch in a track direction (i.e., circumferential direction of the disk).

The above three beams do not overlap each other. For example, the main beam traces the center of a land track (or a groove track), one sub beam traces the center of a groove track (or a land track) adjacent to an outer peripheral side of the land track (or the groove track), and the other sub beam traces the center of a groove track (or a land track) adjacent to an inner peripheral side of the land track (or the groove track). Based on tracing states of the both side beams, a tracking displacement amount can be detected.

The first light beam emitted from the DVD laser 101 is divided into one main beam and two sub beams by the diffraction grating 102a, and also the second beam emitted from the CD laser 103 is divided into one main beam and two sub beams by the diffraction grating 102b. The sub beams reflected from the disk D are detected by the detection areas SAD and SBC. These detection areas detect one of the sub beams for DVD which are diffracted by the diffraction areas other than the diffraction areas K1 and K2, and also one of the sub beams for CD which are diffracted by the diffraction areas other than the diffraction areas K1 and K2.

Next, a method for detecting a tracking error will be explained.

Figure 11:
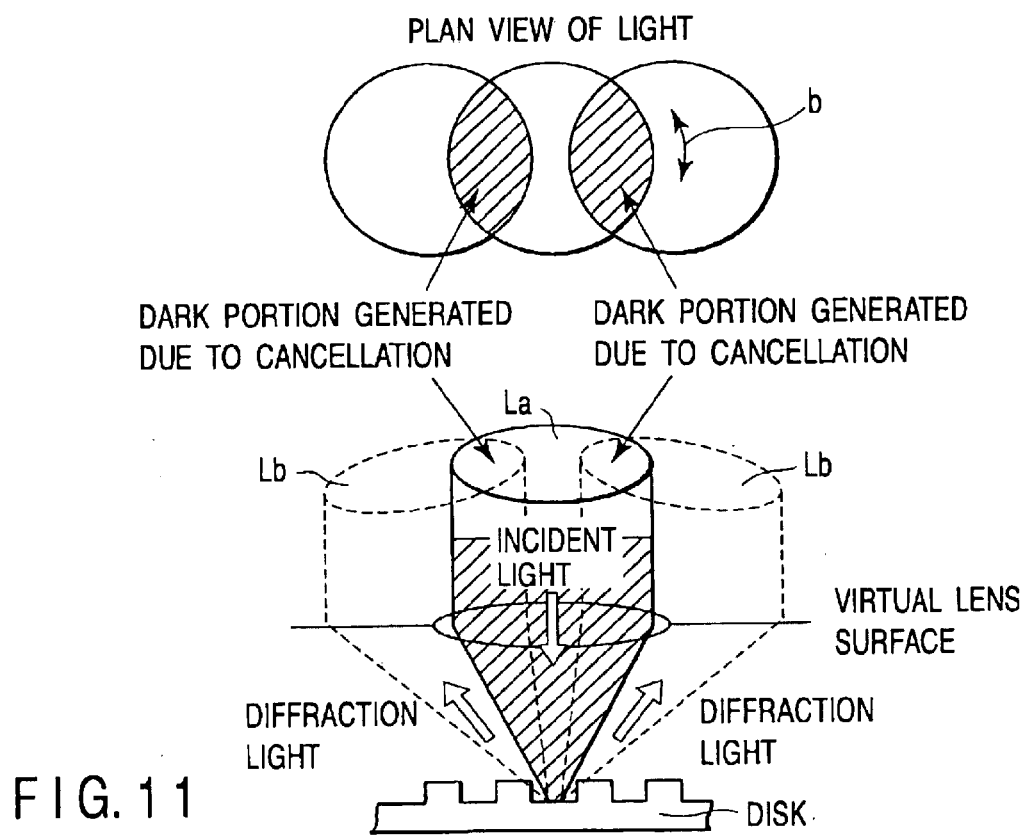
FIG. 11 is a view illustrating a case where a light beam for information reproduction is emitted onto an optical disk.

FIG. 11 is a view illustrating a case where a reproduction beam, i.e., a light beam for information reproduction, is emitted onto the optical disk. When the optical disk is a read-only optical disk such as a DVD-ROM, concave portions of the optical disk are pits, and when the optical disk is a recordable optical disk, concave portions of the optical disk are grooves in which pits are formed by changing phase at the pits. In the read-only optical disk, light is reflected in the same manner as in the recordable optical disk.

When a reproduction beam is scanned over a pit of the optical disk, it is diffracted by the pit. The beams reflected from the disk includes a reflected light La reflected from an upper surface of the pit and diffraction light Lb (± first-order diffraction light) diffracted by the pit. The phase of the reflected light La is different from that of the diffraction light Lb since the diffraction light Lb is diffracted by the pit. Thus, the reflected light La and the diffraction light Lb interfere with each other, and partially cancel each other, thus generating shades as shown in an upper part of FIG. 2.

A method for generating a PP-system tracking error signal will be explained.

When a beam spot is displaced from a track, the distribution of the light intensity of light varies. That is, the light intensities of the right part and left part of light, which are located on the right and left sides with respect to the track, are different from each other. In the pickup head, reflected light is received by the detection areas A, B, C and D, and sub beams are received by the detection areas SAD and SBC, a tracking error signal TES (push-pull) is generated in such a manner as to satisfy the following equation 1:

$$TES \text{ (push-pull)} = (B+C) - (A+D) - K^*(SAD - SBC) \quad \text{(equation 1)}$$

Next, a method for generating a DPD system tracking error signal will be explained.

When a beam is scanned such that its beam spot is displaced from a center line of a stream of pits, the positions of the above shades are shifted as indicated by an arrow b in FIG. 11. In the optical pickup head, light reflected from the disk is received by the detection areas A, B, C and D, a tracking error signal TES (DPD) is generated due to variation of an optical detection output signal which is caused by the above shifting of the shades, in such a manner as to satisfy the following equation (2):

$$TES(DPD) = ph(A+C) - ph(B+D) \quad \text{(equation 2)}$$

FIG. 5B shows a case where reflected light La and diffraction light Lb from the DVD and reflected light La and diffraction light Lb from the CD are incident on the optical diffraction element 110. "Tdvd" represents the reflected light La and diffraction light Lb from the DVD, and "Tcd" represents the reflected light La and diffraction light Lb from the CD. The detection areas A to D are areas where the sizes and positions of shades generated due to interference of beams vary in accordance with variation of the tracking state.

Figure 12:
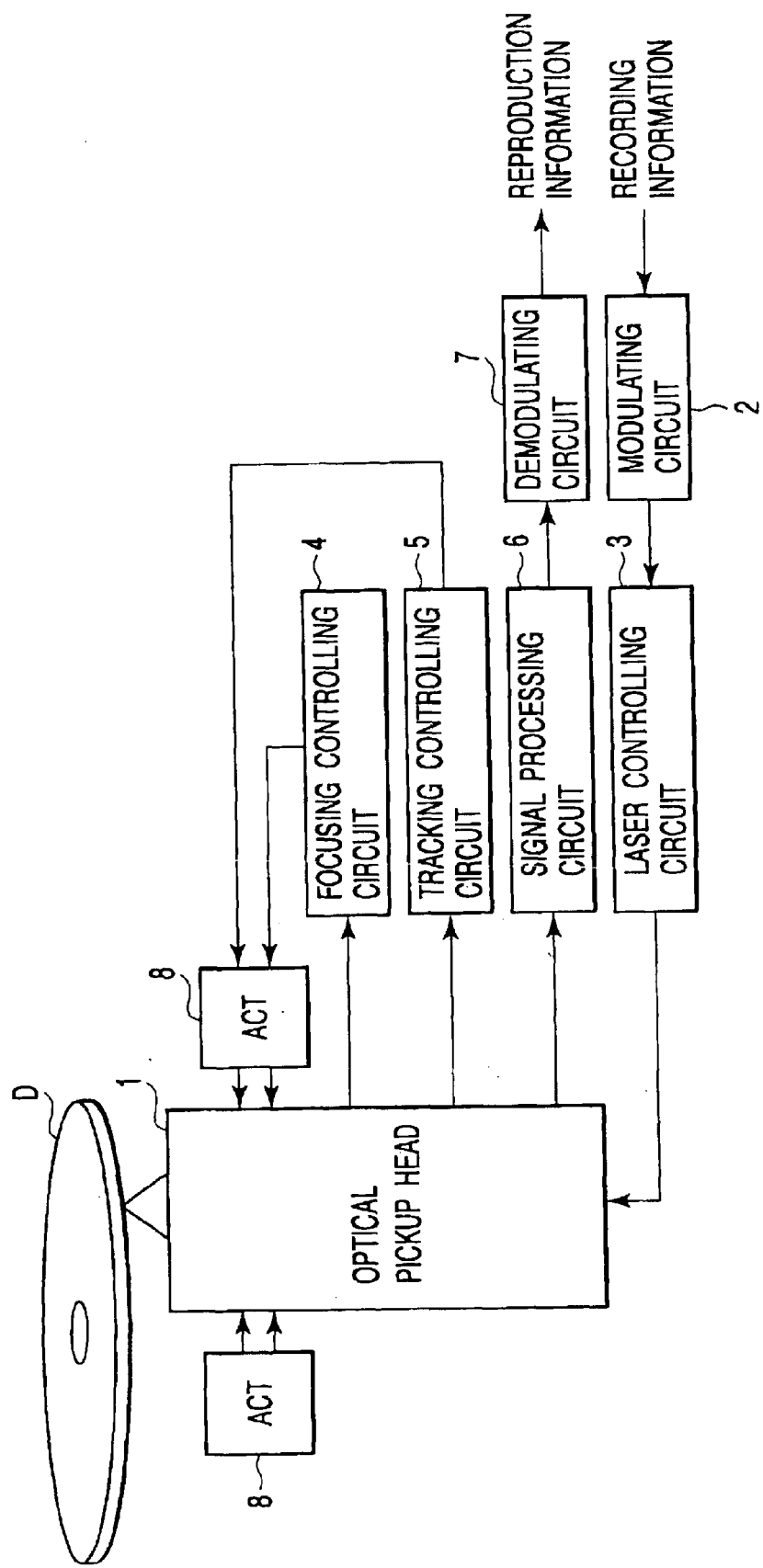
FIG. 12 is a view diagrammatically showing the structure of an optical disk drive to which the present invention is applied.

Next, the structure of an optical disk drive provided with the above optical pickup head will be explained with reference to FIG. 12 diagrammatically showing the structure of the optical disk drive.

The optical disk drive records desired data on an optical disk D such as a DVD or a CD, and reproduces data recorded on the optical disk D.

As shown in FIG. 12, the optical disk drive comprises an optical pickup head 1, a modulating circuit 2, a laser controlling circuit 3, a focusing controlling circuit 4, a tracking controlling circuit 5, a signal processing circuit 6, a demodulating circuit 7, and an actuator 8.

First, it will be explained how data is recorded on the optical disk D by the optical disk drive. A recording signal is modulated by the modulating circuit 2 to obtain a signal of a predetermined channel bit stream. The channel bit stream corresponding to the recording signal is converted to have a laser drive waveform, by the laser controlling circuit 3. The laser controlling circuit 3 pulse-drives the DVD laser 101 or the CD laser 103 to cause the DVD laser 101 or the CD laser 103 to emit a light beam having power for recording. As a result, the light beam having power for recording is converged on the recording surface of the optical disk D to record desired data on the optical disk D. At this time, due to the focusing control of the focusing controlling circuit 4 and the tracking control of the tracking controlling circuit 5, the light beam converged on the optical disk D is maintained such that an optimally minute spot is formed on a track in the recording surface.

Then, it will be explained how the data recorded on the optical disk D is reproduced by the optical disk drive.

In response to a data reproduction instruction, the laser controlling circuit 3 drives the DVD laser 101 or the CD laser 103 to cause the DVD laser 101 or the CD laser 103 to emit a light beam having power for reproduction. As a result, the light beam having power for reproduction is converged on the recorded surface of the optical disk D. Due to the focusing control of the focusing controlling circuit 4 and the tracking control of the tracking controlling circuit 5, the light beam converted on the optical disk D is maintained such that an optimally minute spot is formed on a track in the recorded surface. At this time, the light beam converged on the optical disk D is reflected from a reflection film or a reflective recording film in the recorded surface. The light reflected from the reflection film or the reflective recording film is diffracted by the optical diffraction element 110, and is detected by the optical detection element 107.

Then, based on reflected light components detected by the detections areas of the optical detection element 107, tracking error signals TES (push-pull) and TES (DPD) are generated in such a manner as to satisfy the above equations (1) and (2), respectively, and a focusing error signal (FES) and a reproduction signal (RF) are generated in such a manner as to satisfy the following equations (3) and (4), respectively:

$$FES = (E+F) - (G+H) \quad (3)$$

$$RF = A+B+C+D+E+F+G+H \quad (4)$$

The focusing controlling circuit 4 outputs to the actuator 8 a focusing control signal for use in correcting the focusing error based on the focusing error signal satisfying the above equation (3). The tracking controlling circuit 5 outputs to the actuator 8 a tracking control signal for use in correcting the tracking error based on the tracking error signal satisfying the above equation (1) or (2). The signal processing circuit 6 equalizes and digitizes (binarizes) the reproduction signal satisfying the above equation (4). Furthermore, the demodulating circuit 7 demodulates the digitized reproduction signal based on a demodulating method associated with a predetermined modulating method.

The present invention is not limited to the above embodiment, and may be variously modified without departing from its subject matter when being put to practical use. Furthermore, the above embodiment may be combined with any of its modifications. Thus, if the embodiment is combined with a modification thereof, such a combination can obtain the advantages of the embodiment and the modification. In addition, the embodiment contains a number of inventive aspects at various levels, and a number of inventions can be extracted by appropriately selectively combining a number of structural elements disclosed in the specification. For example, even if some of the structural elements in the above embodiment are deleted, and then if the object of the present invention can be achieved, and the above advantages can be obtained, a structural not including the deleted structural elements can be extracted as an invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical head comprising:
   a first light emitting unit configured to emit a first light beam having a first wavelength and a first optical axis;
   a second light emitting unit configured to emit a second light beam having a second wavelength greater than the first wavelength and a second optical axis;
   a polarizing unit configured to polarize the first and second light beams respectively emitted from the first and second light emitting units, and reflects a first reflected light and a second reflected light which are obtained when the first and second light beams are reflected from an optical disk, respectively;
   a converging unit configured to converge the first and second light beams transmitted through the polarizing unit on the optical disk;
   a detecting unit configured to detect the first and second reflected lights reflected from the polarizing unit; and
   a diffracting unit provided on optical paths of the first and second reflected lights, which are located between the polarizing unit and the converging unit, the diffracting unit being configured to diffract the first and second reflected lights,
   wherein the first and second light emitting units are provided such that when the first and second light beams are incident on the converging unit, one of the first and second optical axes of the first and second light beams diverges from the other by a predetermined angle.

2. The optical head according to claim 1, wherein the detecting means includes an area for focusing, which receives a first reflected light component of the first and second reflected lights diffracted by the diffracting unit, and generates a signal for focusing, and an area for tracking, which receives a second reflected light component of the first and second reflected lights diffracted by the diffracting unit, and generates a signal for tracking.

3. The optical head according to claim 2, wherein:

the diffracting unit is circular, and includes a first diffraction area and a second diffraction area;

where the diffracting unit is defined as a reference circle, the first diffraction area is located within half of an area of the reference circle, and includes a diffraction grating having bars arranged at a first pitch, and the second diffraction area is located opposite to the first diffraction area with respect to a extension line including a center of the reference circle, has substantially the same size as the first diffraction area, and includes a diffraction grating having bars arranged at a second pitch differing from the first pitch; and the area for focusing receives a reflected light component of the first and second reflected lights diffracted by the first and second diffraction areas.

4. The optical head according to claim 3, wherein two circles, which overlap the reference circle, and have centers on a line including a diameter of the reference circle, are defined as a first circle and a second circle, one of two areas of the reference circle which are divided by the line including the diameter of the reference circle, and are other than overlapping areas of the reference circle and the first and second circles, contains the first diffraction area, and the other of the two areas contains the second diffraction area.

5. The optical head according to claim 3, wherein the first and second diffraction areas are spaced from each other, and a diffraction grating configured to guide the first and second reflected lights to the area for tracking is formed in an area which is other than the first and second diffraction areas.

6. The optical head according to claim 3, which further comprises:

a first diffraction element provided between the first light emitting unit and the polarizing unit, and configured to generate a first main beam and first and second sub beams, all having the first wavelength; and a second diffraction element provided between the second light emitting unit and the polarizing unit, and configured to generate a second main beam and third and fourth sub beams, all having the second wavelength, wherein the area for tracking includes a sub-beam receiving area which receives reflected light components of the first to fourth sub beams which are reflected from the optical disk and are diffracted by diffraction areas of the diffracting unit which are other than the first and second diffraction areas.

7. An optical disk drive comprises:

a first light emitting unit configured to emit a first light beam having a first wavelength and a first optical axis;

a second light emitting unit configured to emit a second light beam having a second wavelength greater than the first wavelength and a second optical axis;

a polarizing unit configured to polarize the first and second light beams respectively emitted from the first and second light emitting units, and reflects a first reflected light and a second reflected light which are obtained when the first and second light beams are reflected from an optical disk, respectively;

a converging unit configured to converge the first and second light beams transmitted through the polarizing unit on the optical disk, wherein the first and second light emitting units are provided such that when the first and second light beams are incident on the converting unit, one of the first and second optical axes of the first and second light beams diverges from the other by a predetermined angle;

a detecting unit configured to detect the first and second reflected lights reflected from the polarizing unit;

a diffracting unit provided on optical paths of the first and second reflected lights, which are located between the polarizing unit and the converging unit, the diffracting unit being configured to diffract the first and second reflected lights, and a controlling unit configured to control tracking and focusing based on a component of one of the first and second reflected lights reflected from the polarizing unit, which are detected by the detecting unit.

* * * * *